United States Patent [19]
de Bruijn et al.

[11] Patent Number: 5,322,617
[45] Date of Patent: Jun. 21, 1994

[54] UPGRADING OIL EMULSIONS WITH CARBON MONOXIDE OR SYNTHESIS GAS

[75] Inventors: Theo J. W. de Bruijn, Constance Bay; David J. Patmore, Nepean; Charlene M. Hogan, Ottawa, all of Canada

[73] Assignee: Her Majesty the Queen in Right of Canada as represented by the Minister of Energy, Mines and Resources, Ottawa, Canada

[21] Appl. No.: 925,758

[22] Filed: Aug. 7, 1992

[51] Int. Cl.$^5$ .................. C01B 3/26; C10G 47/02
[52] U.S. Cl. .................. 208/108; 208/109; 208/110; 208/112; 208/126; 423/651; 423/437 M
[58] Field of Search .................. 423/650, 437, 651; 208/108, 109, 110, 112, 126

[56] References Cited

U.S. PATENT DOCUMENTS

| | | | |
|---|---|---|---|
| 2,614,066 | 10/1952 | Cornell | 196/28 |
| 3,291,717 | 12/1966 | White | 208/11 |
| 3,694,344 | 9/1972 | Munro | 208/108 |
| 4,207,167 | 6/1980 | Bradshaw | 208/68 |
| 4,309,198 | 1/1982 | Moss | 48/197 |
| 4,569,753 | 2/1986 | Busch et al. | 208/73 |
| 5,104,516 | 4/1992 | de Bruijn et al. | 423/651 |

FOREIGN PATENT DOCUMENTS

| | | |
|---|---|---|
| 916083 | 12/1972 | Canada . |
| 1124195 | 5/1982 | Canada . |
| 1195639 | 10/1985 | Canada . |

OTHER PUBLICATIONS

Hackh's *Chemical Dictionary*, Fourth Edition, McGraw-Hill Book Co. (1969), p. 596.

*Primary Examiner*—Wayne Langel
*Attorney, Agent, or Firm*—Nixon & Vanderhye

[57] ABSTRACT

Several procedures are provided for the thermal rearrangement of a water emulsion, of or a mixture with water, of a feedstock selected from the group consisting of tar sand bitumen, heavy oil, refinery residue and a heavy waste oil stream, the feedstock containing a naturally-occurring, finely-divided mineral material. The essence of such procedures involves contacting the water emulsion or the water mixture with a gas selected from the group consisting of synthesis gas and carbon monoxide in the presence of a catalytic amount, i.e., from about 0.3% to about 15% of a bifunctional catalyst that facilitates the water gas shift reaction and also promotes the hydrogenation and stabilization of cracking reaction products. The bifunctional catalyst includes the naturally-occurring, finely-divided mineral material which is contained in the feedstock. The process is conducted under such conditions of pressure and temperature that the water gas shift reaction occurs. Thermally rearranged liquid oil having a lower viscosity and a lower density than that of the feedstock is recovered. In addition, separate streams of gaseous carbon dioxide and gaseous hydrogen are also recovered therefrom.

38 Claims, No Drawings

UPGRADING OIL EMULSIONS WITH CARBON MONOXIDE OR SYNTHESIS GAS

BACKGROUND OF THE INVENTION (i) Field of the Invention

This invention relates to procedures for reducing the viscosity and density of heavy oils to make them more suitable for transportation by pipeline from the field to refineries for further processing.

This invention also relates to processes for the generation of both hydrogen and carbon dioxide by one of two alternative schemes: either only reducing the viscosity and density of the heavy oils to a small extent by minimizing thermal cracking; or totally changing the properties of the heavy oil by operating at typical hydrocracking conditions.

(ii) Description of the Prior Art

The decreasing supply of light conventional crude is spurring the use of more heavy oils and bitumen. Much of this heavy oil production is transported by pipeline from the field to refineries for further processing. For example, significant quantities of heavy oil are transported from western Canada to the United States where they are used in asphalt production. However, many of the heavy oils produced do not meet the specifications set by the pipeline companies for viscosity, density and bottoms, sediment and water (BS&W). Currently these oils are blended with large amounts of diluent (natural gas condensate or lighter petroleum fractions) to meet the specifications. However, demand and supply predictions for heavy oil and diluents indicate that a shortage in diluent will develop during the 1990's.

An increasing fraction of the heavy oils are being produced by enhanced oil recovery (EOR) techniques, e.g. steamflood, carbon dioxide flooding or fireflood. Natural surfactants present in the oil often result in stable oil/water emulsions being formed. In such oil/water emulsion, the water is present as small water droplets in a matrix of oil. Sometimes reverse emulsions are formed wherein the oil is present as small droplets in water as the continuous phase. To meet the pipeline specifications for bottoms, sediment and water (BS&W) generally requires removing the water, which was difficult and involves costly chemical and mechanical treatments. Generally (most) water is removed by a combination of gravity separation (sometimes mechanically aided) and by the addition of demulsifiers to break the emulsion. To remove the last traces of water, more severe measures are often required. In addition, certain emulsions, e.g. fireflood emulsions, are very difficult to break. Removal of the last amounts of water often is accomplished by flash evaporation, i.e., the oil is heated to above the boiling point of water. Finally after a clean, water-free oil has been obtained, the viscosity and density specifications still have to be met to allow transportation by pipeline. Again this is accomplished by mixing the oil with diluent.

The prior art has addressed the problem of how to transport such viscous material, while reducing the diluent requirements, by two general classes of treatment. The first class includes processes that do not affect the oil in any way and use water as a substitute for diluent. The second class includes processes that break up the constituent oil molecules and change its properties, thereby reducing both its viscosity and density. In both classes of treatments, the original emulsion water has to be separated first.

Processes in the first class reduce the viscosity by mixing the oil with water and surfactants to prepare an oil-in-water emulsion. This emulsion must be stable enough to withstand the diverse conditions it encounters in the pipeline system, e.g., the high shear stresses in the pumps, yet be easy to break at its destination.

Transportation of the oil using core annular flow is another proposed concept. Here an artificially created film of water surrounds the oil core concentrically. This reduces the viscosity and pressure drop almost to that which would be expected for water. These processes require that, where field emulsions are produced, these emulsions be broken first. Water, and in the case of emulsion transport, surfactants, are then added and mixed under controlled conditions to obtain a stable emulsion or core flow. In all cases where diluents or water are used, a significant part of the capacity of the pipeline is being taken up by a non-heavy oil component, significantly adding to the cost of the system. In the case of water, it might also create a disposal problem at the receiving end of the pipeline, and in the case of diluent, return lines will often be required to transport the diluent back to the field to be mixed again with heavy oil.

Processes in the second class alter the oil properties significantly and are generally of the carbon rejection or hydrogen addition type. Both procedures employ high temperatures (usually > about 430° C.) to crack the oil. In the carbon rejection processes, the oil is converted to lighter oils and coke, while in the hydrogen addition processes the formation of coke is prevented by the addition of high pressure hydrogen. In some coke rejection processes, the coke is burned or gasified to provide heat, or fuel that can be used elsewhere in the process. Both of these upgrading processes significantly increase the distillate yields, because of the thermal cracking of the heavy oil molecules that takes place, which results in significantly altered molecular weight structures and properties. However, because of the extensive cracking that takes place, these high conversion processes destroy the asphalt properties that many of the original heavy oils exhibit. This is a serious concern since asphalt is a high priced commodity.

All hydrogen addition processes require hydrogen to allow the process to proceed without coke formation. Some hydrogen addition processes are described in the prior art that use coke or effluent streams to generate carbon monoxide, which in turn is used to make hydrogen.

For example, U.S. Pat. No. 2,614,066, patented Oct. 14, 1952 by P. W. Cornell, provided a continuous method of hydrodesulfurization, in which the hydrogen utilized in the process was largely obtained from contaminant produced concomitant with the hydrodesulfurization process. The patented process comprised removing sulfur from petroleum hydrocarbons containing sulfurous material at an elevated temperature with a hydrogen-containing gas in the presence of a contact material having hydrogenating characteristics, cooling the effluent to obtain a first gas portion and a hydrocarbon liquid portion containing dissolved gases, separating the hydrocarbon liquid portion, and removing the dissolved gases from the hydrocarbon liquid to form a second gas portion. Substantial amounts of the hydrocarbon portion of this second separated gas portion were then converted into hydrogen through a reforming and shift reaction. The formed hydrogen was recycled for the hydrodesulfurization of the feed petroleum hydrocarbons.

U.S. Pat. No. 3,413,214, patented Nov. 26, 1968 by R. B. Galbreath, provided for the hydrogenation of liquid hydrocarbons which was carried out in the presence of hydrogen and a controlled amount of oxygen to hydrogenate a major portion of the liquid hydrocarbon feed and to oxidize a minor portion thereof, thereby producing a gaseous product containing carbon monoxide. The carbon monoxide content of the gaseous product was subsequently reacted with steam in a separate reactor to form additional hydrogen which was recycled to the hydrogenation zone.

U.S. Pat. No. 3,694,344, patented Sep. 26, 1972 by W. H. Munro, provided a process for the hydroprocessing of hydrocarbon. In the description of the invention, a steam reformer, water-gas shift converter and an acid-gas removal system is combined utilizing compression between the water-gas shift converter and the acid-gas removal system to produce relatively high purity hydrogen for use in a hydrogen-consuming process. In essence, therefore, the invention provides a method for the hydrogenation of hydrocarbons utilizing a specified hydrogen stream which is obtained from a specific hydrogen-producing plant. The hydrogen-producing plant was a steam reforming unit which utilized centrifugal compression between conversion zones and the carbon dioxide adsorption zones of the unit. In the hydrocracking process, the hydrocarbons to be converted into lower-boiling material are contacted with a suitable catalyst under hydrocracking conditions chosen to produce an effluent stream containing unreacted hydrogen, normally gaseous hydrocarbons and normally liquid hydrocarbons.

Suitable catalytic composites comprised at least one metallic component selected from the metals of Groups VI-B and VIII of the Periodice Table combined with a suitable refractory inorganic oxide, e.g. alumina, silica, and mixtures thereof. However, this patent does not teach operation under conditions enabling the recovery, for use later of a gaseous stream of carbon dioxide.

U.S. Pat. No. 3,694,374, patented Sep. 26, 1972 by Y. Yamazaki et al (and its corresponding Canadian Patent No. 943,943 patented Mar. 19, 1974) provided a catalyst for the catalytic cracking or steam reforming of hydrocarbons. According to the patented invention, with the patented catalyst, a desirable oxidation reaction, i.e. water gas reaction is especially promoted. Therefore, the amount of carbon deposited on the catalyst is very small. Formation of tar is also negligible. Thus, a gas having a high content of hydrogen ($H_2$) and consisting of methane ($CH_4$), ethylene ($C_2H_4$), carbon dioxide ($CO_2$) and a small amount of carbon monoxide (CO) is obtained. The patented catalyst was an alkali polyaluminate or a catalyst prepared by adding at least 2% of an alkali polyaluminate, calculated as an alkali metallic oxide ($Na_2O$ or $K_2O$), to other refractory carriers. However, this patent does not teach operation under conditions enabling the recovery, for use later of a gaseous stream of carbon dioxide.

U.S. Pat. No. 4,207,167 patented Jun. 10, 1980 by R. W. Bradshaw, provided a combination process for hydrocarbon cracking, hydrogen production and hydrocracking. The invention provided a combination of process steps which comprises catalytically cracking a hydrocarbon oil, regenerating a used catalyst having coke laydown thereon, the regeneration being effected under conditions to produce a gaseous effluent containing carbon monoxide, subjecting the effluent to a water shift reaction producing carbon dioxide and hydrogen, fractionating cracked oil vapours earlier obtained to obtain among other fractions, a cycle oil and hydrocracking the cycle oil in the presence of the hydrogen earlier produced. That invention provided in combination, steps as follows: catalytic cracking a hydrocarbon oil, regenerating catalyst used in the cracking under conditions to produce gases rich in carbon monoxide, effecting the water shift upon the gases to produce carbon dioxide and hydrogen, fractionating vapours obtained in the cracking of hydrocarbon oil to obtain, e.g. gases, cracked gasoline, a light-cycle oil, a heavy-cycle oil and a heavier fraction of hydrocarbons and hydrocracking at least one of the light and heavy cycle oils with hydrogen obtained in the water shift reaction. The catalyst used may be nickel-molybdenum or cobalt-molybdenum. However, this patent does not teach operation under conditions enabling the recovery, for use later of a gaseous stream of carbon dioxide.

U.S. Pat. No. 4,309,198 patented Jan. 5, 1982 by G. Moss, provided a method of converting liquid and/or solid fuel to an inerts-free gas. In the described inventive process, liquid and/or solid fuel is converted to inerts-free reducing and/or synthesis gas (which may contain at least one of the following compounds: CO, $H_2$, $CH_4$) by treating the fuel in a conversion zone under fuel conversion conditions in the presence of a reducible (and preferably reoxidizable) solid oxygen comprising compounds in the presence of a gaseous phase substance which, under the conversion conditions, promotes the transfer of oxygen from tee solid oxygen-comprising compound to the fuel and/or to a partially-converted component of the fuel. The patent discloses the production of reactant gas by the water gas reaction, using a catalyst known to catalyze the water gas reaction. However, this patent does not teach operation under conditions enabling the recovery, for use later of a gaseous stream of carbon dioxide.

U.S. Pat. No. 4,569,753 patented Feb. 11, 1986 by L. E. Busch et al, provided a process for oil upgrading by thermal and catalytic cracking. The patented process is said to be a unique sequence of operations designed to dispose of and/or handle the undesirable components of reduced crude in a manner permitting conversion of high boiling hydrocarbon components in association therewith to more desirable gaseous and liquid fuel products.

More particularly, the process comprises a thermal visbreaking operation with fluidizable inert solids followed by a fluidized zeolite catalytic cracking operation processing demetallized products for the visbreaking operation, regenerating solid particular of each operation under conditions to provide CO rich flue gases relied upon to generate steam used in each of the fluidized solids conversion operation and downstream product separation arrangements, separating the wet gas product stream of each operation in a common product recovery arrangement and processing the high boiling feed product of visbreaking comprising up to 100 ppm Ni+V metal contaminant over a recycled crystalline zeolite cracking catalyst distributed in a sorbent matrix material comprising a high level of Ni+V metal contaminant. However, this patent does not teach operation under conditions enabling the recovery, for use later of a gaseous stream of carbon dioxide.

Canadian Patent No. 916,083 patented Dec. 5, 1972 by D. A. Messing et al, provided a hydrocracking process in the presence of hydrocarbon containing a minor amount of carbon monoxide. That patent taught the production of hydrogen by the gasification of hydrocarbons to a synthesis gas composed for the most part of carbon monoxide and hydrogen, either by the partial oxidation of hydrocarbons or by the reforming of hydrocarbons with steam. Conventionally, the synthesis gas was passed in the presence of steam into contact with a shift conversion catalyst, e.g. iron oxide, which resulted in the production of a gas composed for the most part of hydrogen and carbon dioxide. The carbon dioxide content was reduced to a negligible level to yield a gas containing about 96-98% hydrogen and about 2% CO, with smaller amounts of other impurities. The patented process involved treating the hydrocarbon oil in the presence of hydrogen using a hydrocracking catalyst comprising an iron group metal under hydrocracking conditions, the hydrogen containing at least 50 ppm CO.

As taught in that patent the catalysts contained two components, a hydrogenating component and a cracking component. The hydrogenating component was an iron group metal, for example, I0 nickel or cobalt. The hydrogenating component was present in an amount between about 5 and 40% by weight of the catalyst composite.

The cracking component was at least one amorphous inorganic oxide having cracking activity, for example, silica, alumina, magnesia, zirconia, and the like, which if necessary had been treated with an acidic agent, e.g. hydrofluoric acid, to impart cracking activity thereto. A preferred mixture of amorphous inorganic oxides taught in that patent contained 60-90% silica and 10-40% alumina. However, this patent did not teach operation under conditions enabling the recovery, for use later, of a gaseous stream of carbon dioxide.

Canadian Patent No. 1,195,639, issued Oct. 22, 1985 by H. S. Johnson, et al, provided a process for upgrading heavy viscous hydrocarbonaceous oil. The patented process involved contacting the oil with a carbon monoxide-containing gas and steam in a reaction zone at hydrocracking conditions, e.g. at a temperature of at least about 400° C. and a pressure between substantially 5MPa and 20 MPa, in the presence of a promoted iron catalyst, to yield a hydrocracked product. The required hydrogen to prevent coke formation was made from carbon monoxide and added water inside the upgrading reactor. No hydrogen or carbon dioxide was recovered.

Canadian Patent No. 1,124,195, issued to Khulbe et al, described a hydrocracking process that operated from about 400 to about 500° C., where synthesis gas was used to supply the hydrogen for the cracking reactions. The synthesis gas was made in a separate reactor.

None of the patented processes described above are suitable for reducing both the viscosity and density of heavy oils without substantially breaking up the constituent molecules of the oil. In all the hydrocracking processes described above, the oil properties were changed significantly. None of the patents taught the use of a bifunctional hydrogenation/water gas shift reaction catalyst. Furthermore, in none of the described processes, were hydrogen and carbon dioxide recovered separately for use in alternative processes.

SUMMARY OF THE INVENTION

(i) Aims of the Invention

One object of the present invention is to provide a thermal and catalytic rearrangement process whereby the viscosity and density of heavy oils are reduced to make the heavy oils more amenable for transportation by pipeline.

A further object of this invention is the program of a process wherein high conversion and upgrading of heating oils is achieved.

Another object of this invention is the provision of such process wherein significant amounts of hydrogen gas are recovered.

Yet another object of this invention is the provision of such process wherein significant amounts of carbon dioxide are recovered.

Still another object of this invention is the provision of such a process wherein a major part of the water present in heavy oil emulsions is converted into hydrogen.

(ii) Statements of Invention

The present invention is an improvement upon the treatment of heavy oil/water emulsions with carbon monoxide under water gas shift reaction conditions, and recovering not only the upgraded heavy oils but also both hydrogen and carbon dioxide and recycling carbon monoxide; namely it is an improvement on the invention provided by applicant's earlier issued U.S. Pat. No. 5,104,516 patented Apr. 14, 1992, the contents of which are incorporated herein by reference.

The present invention now additionally provides a process for the thermal rearrangement of a water emulsion, or a mixture with water, of a feedback selected from the group consisting of tar sand bitumen, heavy oil, refinery residue and a heavy waste oil stream, the feedstock containing a naturally-occurring, finely-divided mineral material water emulsion or the water mixture with a gas selected from the group consisting of synthesis gas and carbon monoxide in the presence of a catalytic amount, of about 0.03 to about 15%, of a bifunctional catalyst that facilitates the water gas shift reaction and also promotes the hydrogenation and stabilization of cracking reaction products, the bifunctional catalyst including the naturally-occurring, finely-divided mineral material which is contained in the feedstock the process being conducted under such conditions of pressure and temperature that a water gas shift reaction occurs. Thermally rearranged liquid oil having a lower viscosity and a lower density than the feed material is recovered. In addition, separate streams of gaseous carbon dioxide and gaseous hydrogen are also recovered therefrom.

The present invention also provides a catalyst which is recovered from the above reaction by the process of a) separating solids from the oil product; and b) using the solid so recovered directly as catalyst.

The present invention also provides a catalyst which is recovered from the above reaction by the process of a) distilling the oil product; b) gasifying or burning the pitch so separated; and c) collecting the ash so produced, for use directly as 15 regenerated catalyst.

(iii) Other Features of the Invention

In one feature of this invention, the bifunctional catalyst includes clay, sand or sand fines which are present in the feedstock as the naturally-occurring, finely-divided material. Such bifunctional catalyst is normally present in the feedstock in a refinery process stream. Alternatively, the naturally-occurring mineral matter is added separately to the feedstock.

In another feature of the invention the catalyst includes an inorganic base, e.g. hydroxides or carbonates of potassium, sodium or calcium; preferably it is potassium carbonate.

In yet another feature of the invention, the bifunctional catalyst includes an iron compound, e.g. iron oxide, iron sulphate, iron sulphide, an iron-containing waste material or, preferably, a Fe/Cr catalyst. The bifunctional catalyst may also include a Co/Mo catalyst. In such feature, the catalyst may be present in an amount of about 0.03 to about 15 wt %.

In yet another feature of the invention, water emulsion of the feedstock or the mixture of water and the feedstock may be derived from an in-situ oil recovery operation or from a tar sand mining processing step and may be prepared subsequent to recovery of the feedstock. Still further, some or all of the water required for the water gas shift reaction present in the water emulsion of the feedstock or in the mixture of water and the feedstock which may provide at least part of the water required for the water gas shift reaction may be mixed with the feedstock prior to carrying out the thermal rearrangement reaction.

In a still further feature of the invention, the temperature may be within the range of about 250° to about 460° C., e.g. within the range of about 375° to about 400° C., thereby reducing both the viscosity and the density of the heavy oil, while minimizing cracking reactions; preferably the temperature is within the range of about 400° C. to about 460° C.

In a further feature of the invention, the pressure may be within the range of about 100 to about 3000 psi, e.g. within the range of about 500 to about 1500 psi.

In another feature of the invention, the process may be carried out with a gas-to-liquid ratio within the range of about 9 L/kg to about 3500 L/kg. In yet another feature of the invention, the process may be carried out at a space velocity within the range of about 0.1 to about 20 per hour. In still another feature of the invention, the process may be carried out at a residence time within the range of about 10 hours to about 3 minutes. In still another feature of the invention, the process may be carried out with a carbon monoxide/water ratio of about 0.1 to about 15. The carbon monoxide used is preferably in the form of a mixture of carbon monoxide and hydrogen.

In still another feature of the invention, the carbon monoxide may be formed in situ and the excess carbon monoxide may be recovered, e.g. the carbon monoxide produced may be removed either by a scrubbing process, or by a pressure swing absorption process, or by a membrane separation process. The hydrogen produced may be removed either by a scrubbing process, or by a pressure swing absorption process, or by a membrane separation process.

The carbon dioxide produced is also removed. Preferably, the carbon dioxide produced may be removed either by a scrubbing process, or by a pressure swing absorption process, or by a membrane separation process; preferably also the hydrogen produced may be removed either by a scrubbing process, or by a pressure swing absorption process, or by a membrane separation process.

The carbon monoxide may be produced in situ by the decomposition of a precursor thereof, e.g. from methanol.

In another feature of this invention, water which is present in the water emulsion of the feedstock or which is present in the mixture of water in the feedstock is reacted to produce excess hydrogen. Alternatively, the emulsion of the feedstock may be a water-in-oil emulsion, or the water emulsion of the feedstock may be an oil-in-water emulsion. In another variant, the feedstock also includes metal impurities and the process is carried out to effect removal of substantially all of such metal impurities and the process should be carried out to effect removal of substantially all of the metals impurities.

In a still further feature, the process is carried out to a pitch conversion of less than about 20 wt %.

In the spent catalyst recovering process, the solids may be separated by a physical separation procedure selected from the group consisting of centrifuging, gravity settling and solvent deashing. Preferably, such solids are subjected to a pretreatment step prior to being used as a catalyst, such pretreating step preferably is roasting.

In another variant of the spent catalyst recovering process, the ash is subjected to a pretreatment step prior to being used as a catalyst, preferably when the pretreatment step comprises roasting. The step of gasifying the pitch thereby also generates CO.

The overall process of this invention has a net hydrogen production. The hydrogen is produced by the water gas shift reaction:

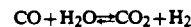

$$CO + H_2O \rightleftharpoons CO_2 + H_2$$

Thus in embodiments of this invention, the heavy oil/water emulsion is contacted with carbon monoxide. The mixture is brought to reaction pressure and heated to reaction temperature, where, preferably, in the presence of the bifunctional catalyst, the carbon monoxide and water react to form in-situ hydrogen. The process can operate in three temperature ranges depending on whether emulsion breaking only, or emulsion breaking combined with viscosity reduction (without affecting the structure of the oil components to a large extent) or high distillate yields are the objective. The range of operating conditions according to these features of this invention are as follows: temperature, about 250 to about 460° C.; space velocity, about 0.1 to about 20 per hour; carbon monoxide/water ratios, about 0.3 to about 3.0 mole/mole; and pressure, about 0.8 to about 20.8 Mpa (about 100 to about 3000 psig).

At the intermediate range of temperatures, (about 300 to about 400° C.) described above, the water gas shift reaction starts to occur in the oil phase. One important feature of this invention is specifically designed to operate in such temperature region. Water is not just separated but is converted to valuable hydrogen, while the oil properties that are important for pipelining are improved without significantly altering the molecular structures. The change in oil properties is the result of thermal rearrangement, e.g., hydrogenating unsaturated bonds, and breaking off some side chains, but without substantial breaking up of the constituent molecules into small fragments (gas).

Cracking starts to become predominant above about 400° C. or above about 20 wt % pitch conversion. An indication of cracking and breaking up of the constituent molecules into small fragments is that the gas make (hydrocarbons and hydrogen sulphide) rapidly increases above about 20 wt % pitch conversion. One feature of the present invention operates under control of the temperature and pressure conditions to avoid pitch conversion over about 20 wt %.

In the high temperature range (about 400° to about 460° C.) the water gas shift reaction occurs very rapidly, though the equilibrium becomes slightly less favourable. Towards higher temperatures, more of the hydrogen is being used in hydrogenation reactions and to cap radicals formed by thermal cracking reactions. However, under the proper conditions, a net hydrogen production still results. The oil properties change very significantly, destroying the properties of the original oils. Distillate yields and pitch, sulphur and CCR conversion increase, while viscosity and density are further reduced.

An intrinsic advantage of the present invention is that it is an environmentally benign process that can be an emulsion breaking process alone. However it is primarily intended to be a low cost combined emulsion breaking/viscosity reduction process which breaks the emulsion and simultaneously reduces substantially or even eliminates the need for diluent by reducing the viscosity and density of the resulting oil. At the same time, it minimizes changes to the heavy oil structures and produces valuable hydrogen and carbon dioxide gases from the water and carbon monoxide. Alternatively, it can be an emulsion breaking/high severity upgrading process that significantly changes the heavy oil properties but increases distillate yield and conversions. Thus, in the last two cases, the emulsion is broken not only by just removing the water but also by converting it to valuable hydrogen, thereby reducing waste water. Furthermore, the hydrogen produced can be used in other processes to upgrade secondary streams, e.g., naphtha or gas oils, or used in fuel cells, while the carbon dioxide produced could be used for enhanced oil recovery (carbon dioxide flooding).

The product can be separated in whatever scheme is convenient. Often the product is separated into two or more stages. By proper selection of the last stage, a mainly pitch-containing stream could be produced that would contain all solids and could be used for gasification to produce a carbon monoxide-containing gas for use in the reactor to convert the water. The gases can be separated in any suitable separation process and to the extent that is required for the particular application. For example, the stream could be separated into hydrogen, carbon monoxide and carbon dioxide. The hydrogen could be used for further upgrading of the oil products or fraction of it, in other processes, e.g. hydrocracking, hydrotreating, or may be used in different applications, e.g. fuel cells. The carbon monoxide is recycled to the reactor, while the carbon dioxide could be used to enhance the recovery of the heavy oil. The waste streams from the process are virtually non-existent. A waste stream from one part is a valuable reactant in another part, e.g., the water in the emulsion.

As mentioned briefly previously, the carbon dioxide made from the reaction can, after removal by, for example, a scrubbing process or a pressure swing absorption process, or a membrane separation process, be used in other processes to improve enhanced oil recovery processes. Many commercial processes currently use enhanced oil recovery techniques whereby the oil field is flooded with carbon dioxide (miscible or immiscible). In the USA, carbon dioxide gas wells are present at several places that can supply the required quantities. In Canada (Alberta and Saskatchewan), however, no carbon dioxide wells are available. This integrated process embodiment of the present invention could provide a ready supply of carbon dioxide which would be close to the locations where it is required.

After the reaction is completed, the catalyst may be recycled. The spent catalyst ends up in the oil product. The solids may be separated from the oil or the product may be distilled and the pitch gasified or burned. The ash from these steps may be used as catalyst, with some pretreatment.

As mentioned briefly previously, the present invention preferably operates in two temperature ranges, namely about 330° to about 400° C. or about 400° to about 460° C. In these ranges, the water gas shift reaction converts the water to hydrogen, while simultaneously the viscosity is significantly reduced and the extent of thermal cracking minimized (first range), or high distillate yields are produced (second range). Only a very small fraction of the hydrogen is used in reactions with the heavy oil; the extent depends on the temperature and the catalyst. Overall, the process of the present invention is a significant net producer of hydrogen, which can be used in other processes to upgrade (hydrotreat) distillate streams from the oil, or be used for other purposes, e.g. fuel cells.

The process of the present invention can be used to break any emulsion irrespective of the oil properties and whether it is an oil/water emulsion, a water/oil emulsion, a field emulsion or an artificially created emulsion. It can be used to reduce the oil viscosity and density, substantially to eliminate or to reduce the diluent requirements, or increase distillate yields and reduce the content of pitch, sulphur and the like.

The gas used to convert the water is preferably carbon monoxide but can be a mixture of carbon monoxide and hydrogen (for example, synthesis gas). Such synthesis gas would be easier to make than pure carbon monoxide. However, any source of carbon monoxide would suffice; it could even be generated in situ by decomposing a precursor thereof, e.g., methanol.

As mentioned briefly previously, the concentration or pressure of carbon monoxide should be optimized to convert as much water as possible. At very low pressures, the carbon monoxide concentration in the liquid phase might become the limiting factor in the water conversion. A range of about 0.8 to about 21 MPa (about 100 psi to about 3000 psi) is possible though about 500 to about 1500 psi is preferred. The final choice will depend on the relation between space velocity, temperature and pressure for the particular feedstock in question. In general, the process operates at gas to liquid ratios of about 9 'l kg to about 3500 l/kg. The nominal space velocity or residence time can range from about 0.1 to about 20 per hour or about 10 hours to about 3 minutes, respectively, depending on whether the process is executed as a continuous or batch operation. The temperature will range from about 250° C. to about 460° C.

The first part of the bifunctional catalyst includes an iron compound, e.g., iron oxide or sulphate which act mainly as a hydrogenation catalyst. In the reaction zone, the iron salt can convert to an iron sulphide compound. The concentration of the catalyst can vary widely, depending in general on its surface area. Less catalyst would be required if it was finely divided than when it was very coarse. The concentration of the first part of this bifunctional catalyst could range from about 0.03 to about 5 wt % depending on the type of salt and its dispersion.

The second part of the bifunctional catalyst includes bases, e.g. alkali metal salts, e.g. carbonates and hydroxides which are mainly responsible for catalyzing the water-gas shift reaction. A typical such catalyst is potassium carbonate. Such second part of the bifunctional catalyst may be added in a ratio of about 0.01 to about 0.5 based upon the first part of the bifunctional catalyst. The composite bifunctional catalyst is in a finely divided form and is mixed with the emulsion prior to entering the reactor. The catalyst would normally be smaller than 1 mm, unless it would break up under the reaction conditions. No lower limit is required; nevertheless, useful catalysts typically have a size below about 20 μm.

In addition to the use of inexpensive iron salts, iron-containing ores or other waste materials as catalysts, the following typical water-gas shift catalysts, e.g., Fe/Cr or Co/Mo catalysts, may be used. They can advantageously affect the water conversion and promote more or less hydrogenation or cracking, if so desired.

The process of various features of this invention will now be further described by the following examples, which illustrate typical embodiments of the invention.

Description of Preferred Embodiments p Typical pipeline specifications for crude oil, which may be provided by the process of this invention, are shown below in Table 1:

TABLE 1

| Typical Pipeline Specifications For Crude Oil | | |
|---|---|---|
| | API values | Metric equivalent |
| Viscosity cSt (max.) | | |
| 70 F | 118 | 88.8 @ 25 C |
| 100 F. | 48 | 43.5 @ 40 C |
| Pour point, F (max.) | 25 | −4 C |
| BS&W (max.) | 0.5 | 0.5 |
| Gravity (min.) | 20 | — |
| Density, g/cc (max.) | — | 0.934 |

EXAMPLE 1

Example of Upgrading of Lindbergh Heavy Oil Using Continuous Bench Scale Unit

The equipment used for these bench scale test runs consisted of a high pressure, continuous bench scale unit. Heavy oil/water emulsion is mixed with catalyst and recycled process gas and fed via a preheater to a 350 ml tubular reactor which is electrically heated to the desired temperature. The effluent from the reactor is then fed to a hot separator where a heavy oil product is separated from the hot vapour and continuously let down to ambient conditions into a weighed receiver. The vapour then passes through a water condenser to a cold separator where a light oil product and unreacted water is separated from the gas stream and continuously let down to ambient conditions into another weighed receiver The gas stream is then passed through an oil scrubber where hydrocarbon gas, hydrogen sulphide and carbon dioxide are removed. Carbon monoxide is added to the recycle gas stream to maintain process pressure The gas stream is then mixed with feed prior to the preheater. All off gas volumes are monitored and the streams routinely analyzed The heavy and light liquid products were combined in production ratio and analyzed.

The properties of the Lindbergh feedstock used for these tests are listed in Table 2.

TABLE 2

| Analysis of Feedstocks | | |
|---|---|---|
| Analysis | Lindbergh heavy oil | Athabasca bitumen |
| Ash wt % | 0.21 | 0.80 |
| Toluene insoluble wt % | 0.34 | 0.63 |
| Pentane insoluble wt % | 13.4 | 18.4 |
| Density g/cc | 0.9776 | 1.027 |
| Sediment wt % | 0.20 | — |
| Water wt % | 7.00 | 0.0 |
| Viscosity @ 25° C. cPs | 3311 | — |
| Viscosity @ 40° C. cPs | 942 | — |
| Viscosity @ 100° C. cPs | — | 414 |
| Viscosity @ 150° C. cPs | — | 49.5 |
| Carbon wt % | 79.00 | 83.02 |
| Hydrogen wt % | 10.90 | 10.00 |
| Nitrogen wt % | 0.37 | 0.6 |
| Sulphur wt % | 3.50 | 4.97 |
| D1160: IBP °C. | 28.4 | 271 |
| $H_2O$ wt % | 5.68 | 0.0 |
| Total dist. wt % | 48.47 | 41.3 |
| Residue wt % | 43.05 | 58.2 |
| Loss wt % | 2.80 | 0.5 |
| MCRT wt % | 10.9 | 15.4 |
| Vanadium ppm | 112 | 236 |
| Nickel ppm | 47 | 91 |
| Iron ppm | 262 | 265 |
| Titanium ppm | 16 | 202 |
| Aluminium ppm | 195 | 1146 |
| Silicon ppm | 421 | 1644 |
| Sodium ppm | 73 | 83 |
| Potassium ppm | 24 | 129 |
| Calcium ppm | 18 | 0 |
| Magnesium ppm | 19 | 50 |

Some typical test runs are listed in Table 3 showing typical operating conditions employed and the results. The feed used was a heavy oil/water from the Lindbergh area containing about 7 wt % water. Water was added to investigate different levels of water content up to 22 wt %.

Typical reaction temperatures ranged from 380° C. to 430° C. and liquid hourly space velocities from 0.25 to 1.43 reactor volumes per hour were used in these test runs. Pressures as low as 500 psi were successfully employed. The catalyst concentration in the runs shown ranged from 1.25 wt % to 0.25 wt %. As the process operated successfully at the lowest catalyst concentration used, even lower catalyst are expected to be viable.

Conversions of pitch (material boiling above 524° C.) from 20 to about 70 wt % were obtained while sulphur conversions ranged up to 43 wt %. The process is particularly effective at removing asphaltenic material from the feed with asphaltene conversions above 70 wt % being achieved.

Typical viscosity and specific gravity pipeline specifications for crude oil (shown in Table 1 above) were exceeded at pitch conversion levels above about 45 wt %.

Continuous operation for periods up to 14 days were routinely achieved.

TABLE 3

Upgrading Lindbergh Heavy Oil/Water Emulsion using continuous bench scale unit.

| Run | Feed[a] | 1 | 2 | 3 | 4 | 5 | 6 | 7 | 8 |
|---|---|---|---|---|---|---|---|---|---|
| Temperature, °C. | — | 380 | 380 | 410 | 420 | 430 | 410 | 380 | 420 |
| LHSV | — | 0.25 | 0.5 | 0.5 | 0.5 | 1.43 | 0.5 | 0.5 | 0.5 |
| Water, wt % | — | 20 | 12 | 12 | 12 | 22 | 22 | 11 | 11 |
| Pressure, psi | — | 1000 | 1000 | 1000 | 1000 | 1000 | 500 | 1000 | 1000 |
| $Fe_2O_3$, wt % | — | 2 | 2 | 2 | 2 | 2 | 2 | 0.20 | 0.20 |
| $K_2CO_3$, wt % | — | 0.2 | 0.2 | 0.2 | 0.2 | 0.2 | 0.2 | 0.05 | 0.05 |
| Run length, h | — | 20 | 24 | 32 | 42 | 10 | 14 | 18 | 18 |
| Pitch conversion, wt % | — | 37.4 | 20.36 | 49.9 | 68.5 | 41.9 | 57.23 | 23.9 | 67.3 |
| Sulphur conversion, wt % | — | 17 | 9 | 23 | 43 | 17 | 27 | 15 | 35 |
| Asphaltene conversion, wt % | — | 49.9 | 37.6 | 57.0 | 70.3 | 46.8 | 73.8 | 31 | 64 |
| H—C gas yield, wt % dry feed | — | 1.4 | 0.76 | 2.38 | 3.44 | 1.72 | 2.85 | 0.73 | 2.70 |
| Water conversion, wt % | — | 26 | 43 | 61 | 62 | 19 | 27 | 19 | 68 |
| CO conversion, vol % | — | 27 | 42 | 48 | 48 | 71 | 44 | 20 | 40 |
| $H_2$ conversion, vol % | — | 44 | 51 | 66 | 60 | 70 | 71 | 57 | 51 |
| Hydrogen consumption, wt % dry feed | — | 0.33 | 0.34 | 0.61 | 0.66 | 0.40 | 0.61 | 0.16 | 0.40 |
| Viscosity, cSt @ 25° C. | 3613 | 104 | 359 | 56.4 | 17.54 | 68.7 | 53.5 | 329 | 49.1 |
| Specific Gravity, 60/60 F | 0.9873 | 0.9527 | 0.9600 | 0.9400 | 0.9200 | 0.9467 | 0.9241 | 0.9636 | 0.9311 |

[a]Properties of dehydrated Lindbergh Heavy Oil

EXAMPLE 2

Examples of Fines Catalyst

The effect of solid fines on upgrading of Athabasca bitumen was studied using a 1 litre 316 SS autoclave (Autoclave Engineers), equipped with a MAGNEDRIVE ™ stirrer, and a 4.5 cm diameter 3-bladed propeller. The following operating conditions and laboratory work-up procedures were used.

The autoclave was charged with 80 g (±2 g) dry bitumen, 20.0 g (10% wt/wt) water and the designated catalyst. The vessel was pressure tested at 3,000 psi with nitrogen. The pressure was reduced to atmospheric and the nitrogen removed by flushing with carbon monoxide. The vessel was then repressurized with carbon monoxide to 560 psig at 20° C. to give a 1:1 $H_2O:CO$ ratio. This concentration of water and carbon monoxide was calculated to give an initial pressure of 2000 psi at 400° C. The autoclave temperature was ramped from room temperature to 390° C. at 2.5° C./min, held at 390° C. for 10 min, ramped to 410° C. at 1.0° C./min and maintained at 410° C. for the 1-h run. The pressure was not controlled during the run. When the run was completed the reaction was ended immediately by passing cold water through a cooling coil inside the autoclave.

When the reactor had cooled to room temperature the gas was discharged into a gas sampling bag (Calibrated Instruments Inc.) and the volume of gas collected was recorded using a wet test meter. Gas composition was determined by gas chromatography (Carle Erba GC). The autoclave was opened and the liquid and solid products were collected. Material adhering to the vessel and stirrer was removed by scraping and washing with toluene. The solids and washings were kept for further work-up.

Part of the liquid was centrifuged for 2 h at 50° C. to remove catalyst fines, ash and coke solids. The centrifugate was mixed with calcium sulphate (2 parts $CaSO_4$), to remove water remaining in the sample. The sample was centrifuged for 3 h at 50° C., then the centrifugate was collected for analysis.

Some preliminary results are summarized in Table 4.

TABLE 4

Upgrading Athabasca bitumen using solid fines

| Conditions, Temperature °C./Time h | Bitumen feedstock Athabasca bit. I[a] | | | Athabasca bit. II[b] | | |
|---|---|---|---|---|---|---|
| | Unreacted | 410/1 | 410/1 | Unreacted d | 410/1 | 410/1 |
| $CO/H_2O$ | — | 0.96 | 0.96 | — | 0.96 | 0.96 |
| Water, wt %[c] | — | 10 | 10 | — | 10 | 10 |
| $Fe_2O_3/K_2CO_3$ Catalyst | — | None | None | — | None | 1.64 |
| Fines content, wt %[d] | 0.8 | 0.8 | 0.8 | 7.2 | 7.2 | 7.2 |
| Added "Clay" fines, wt %[e] | — | None | 4.3 | — | None | None |
| CO conversion, vol % | — | 25.83 | 30.06 | — | 40.79 | 44.91 |
| $H_2$ consumption, wt % bitumen | — | 0.205 | 0.229 | — | 0.226 | 0.231 |
| Hydrocarbon gas, wt % | — | 1.44 | 1.34 | — | 1.21 | 1.00 |
| Asphaltene conversion, wt % | — | 41.64 | 42.2 | — | 36.88 | 35.58 |
| TIOR yield, wt %[f] | — | 0.98 | 0.55 | — | 0.14 | 0.05 |
| Viscosity, cPs @ 100° C. | 414 | — | — | 236 | — | — |
| Viscosity, cPs @ 25° C. | — | 243 | 186 | — | 152 | 215 |

TABLE 4-continued

| | Upgrading Athabasca bitumen using solid fines | | | | | |
|---|---|---|---|---|---|---|
| | Bitumen feedstock | | | Athabasca bit. II[b] | | |
| Conditions, | Athabasca bit. I[a] | | | Unreacted | | |
| Temperature °C./Time h | Unreacted | 410/1 | 410/1 | d | 410/1 | 410/1 |
| Specific Gr., 60/60 F | 1.027 | 0.991 | 0.987 | 1.032 | 0.972 | 0.976 |

[a]After hot water separation
[b]Prior to complete separation of solids
[c]Weight percent of dry bitumen feed
[d]Original solids content of feed
[e]Clay and other mineral fines separated from bitumen II
[f]TIOR = toluene insoluble organic residue (Toluene insolubles - ash)

Experiments were conducted with Athabasca bitumen produced by the hot water separation process (bitumen I in Table 4) and Athabasca bitumen that still contained 7.2 wt % solid fines (clay and other minerals also called clay fines, bitumen II in Table 4). By adding 4.3% clay fines separated from bitumen II to bitumen I, a significant increase was observed in the CO conversion (26 to 30 vol. %) and consumption of hydrogen produced by the water gas shift reaction (0.205 to 0.229 wt %). An even higher CO conversion was observed for bitumen II that contained 7.2 wt % clay fines (41 vol %). Addition of $Fe_2O_3/K_2CO_3$ catalyst to bitumen II increased the CO conversion to 45 vol %. The viscosity and specific gravity reduction of bitumen I was increased by the addition of fines from bitumen II.

The production of hydrocarbon gases decreased with the amount of fines added, implying reduced cracking of the bitumen. The production of TIOR (toluene insoluble organic residue) is used as an indicator of the coke formation. In the case of bitumen II, little TIOR was produced suggesting that the solid fines originally contained in the bitumen inhibit coke formation. This is important for long term plant operation.

It is apparent from these preliminary results that solid fines contained in Athabasca bitumen act as a catalyst for the emulsion upgrading process.

EXAMPLE 3

Example of Recycled Catalyst, $Fe_2O_3:K_3CO_3$ Ratio, and Use of other Bases

Recycled catalyst was prepared by ashing a sample of pitch made by distillation of product from a previous test in which heavy oil/water emulsion was treated with CO in the presence of 2 wt % of a 10:1 mixture of $Fe_2O_3$ and $K_2CO_3$.

The activity of this recycled catalyst was tested using the same experimental procedures detailed in the previous example of the use of high fines. The operating conditions and results of the test are shown in Table 5 which also includes other examples showing the results using fresh catalysts consisting of $Fe_2O_3$ combined with different bases ($K_2CO_3$, NaOH and $CaCO_3$).

Comparing test runs 3 and 4 in Table 5 it is seen that 1 wt % of the recycled catalyst is similar in activity to 1.9 wt % of the fresh catalyst. Although water conversion is slightly lower, the hydrogen consumption is higher, and in fact had the highest value of all the catalysts tested. This increased hydrogenation activity is believed to be due to the reduction in particle size during the ashing procedure. The recycled catalyst had a mean volume average particle diameter of 5 μm compared to 19 μm for the fresh $Fe_2O_3$. Recycling the catalyst can therefore be beneficial to the process. Unconverted pitch from the process can be combusted to produce process heat and recycled catalyst or preferably gasified to produce process CO and recycled catalyst.

Test runs 4, 5 and 6 illustrate the effect of $Fe_2O_3:K_2CO_3$ ratio on activity. Water conversion tends to increase as the $K_2CO_3$ concentration increases for a given $Fe_2O_3$ concentration. The catalyst concentration and composition can be varied over a wide range to achieve the desired water conversion and degree of heavy oil upgrading for a particular application.

Tests 7 and 8 illustrate the use of other bases besides $K_2CO_3$, NaOH and to a lesser extent $CaCO_3$ were found to have acceptable activities, and have the advantage of having lower costs than $K_2CO_3$.

In all cases with added catalysts (tests 3 to 8) the product quality was not greatly affected by the catalyst used. The experiments were designed to compare catalysts and not to meet specific product qualities or achieve high conversions of the heavy oil. In practice, the process can be operated to achieve the desired product properties such as viscosity and gravity in order to meet particular specifications such as pipeline transportation.

TABLE 5

| Feedstock: | Upgrading Athabasca bitumen/water emulsion with fresh and recycled catalyst. | | | | | | | |
|---|---|---|---|---|---|---|---|---|
| Example no. | | | | | Athabasca bitumen | | | |
| | 1 | 2 | 3 | 4 | 5 | 6 | 7 | 8 |
| Temperature, °C. | —[a] | 400 | 400 | 400 | 400 | 400 | 400 | 400 |
| Time, h | — | 1 | 1 | 1 | 1 | 1 | 1 | 1 |
| $CO/H_2O$ | — | 1.0 | 1.0 | 1.0 | 1.0 | 1.0 | 1.0 | 1.0 |
| Water, wt % | — | 5 | 5 | 5 | 5 | 5 | 5 | 5 |
| Catalyst added | — | None[b] | 1 wt % Recycled ash | 1.7% $Fe_2O_3$ 0.17% $K_2CO_3$ | 1.6% $Fe_2O_3$ 0.3% $K_2CO_3$ | 0.5% $Fe_2O_3$ 0.5% $K_2CO_3$ | 0.5% $Fe_2O_3$ 0.15% NaOH | 0.5% $Fe_2O_3$ 0.35% $CaCO_3$ |
| CO conversion, vol % | — | 27.7 | 41.3 | 45.0 | 52.8 | 49.8 | 37.8 | 31.4 |
| Water conversion, wt % | — | 31.7 | 45.1 | 49.1 | 58.5 | 55.2 | 42.8 | 35.2 |
| $H_2$ conversion, wt % $H_2$ produced | — | 59.5 | 60.6 | 48.7 | 44.4 | 40.8 | 58.9 | 60.5 |
| $H_2$ consumption, wt % bitumen | — | 0.106 | 0.153 | 0.137 | 0.150 | 0.126 | 0.140 | 0.119 |

TABLE 5-continued

Upgrading Athabasca bitumen/water emulsion with fresh and recycled catalyst.

| Feedstock: | Athabasca bitumen | | | | | | | |
|---|---|---|---|---|---|---|---|---|
| Example no. | 1 | 2 | 3 | 4 | 5 | 6 | 7 | 8 |
| Hydrocarbon gas, wt % | — | 0.88 | 0.81 | 0.59 | 0.59 | 0.83 | 0.81 | 0.83 |
| Asphaltene conversion, wt % | — | 23.9 | 21.1 | 33.48 | 34.9 | 26.5 | 24.4 | 22.1 |
| TIOR yield, wt %[c] | — | 0.27 | — | 0.32 | 0.24 | 0.14 | 0.19 | 0.19 |
| Viscosity, cPs @ 100° C. | 414 | — | — | — | — | — | — | — |
| Viscosity, cPs @ 25° C.[d] | — | 592 | 1230 | 1350[f] | 1040[e] | 1410 | 1070 | 1230 |
| Specific Gr., 60/60 F | 1.027 | 0.995 | 1.003 | 0.995[f] | 0.991[e] | 1.000 | 0.996 | 0.997 |

[a]Unreacted feed.
[b]Contains 0.8 wt % mineral matter.
[c]Toluene insoluble organic residue (toluene insoluble - ash).
[d]Measured on dry product unless otherwise stated.
[e]Contains 2.1 wt % unreacted water.
[f]Contains 2.54 wt % unreacted water.

OPERATION OF PREFERRED EMBODIMENTS

In summary, the data indicate that the water-gas shift reaction occurs rapidly at very modest temperatures and supplies more hydrogen than is taken up by the hydrogenation reactions.

A simple low severity process for simultaneously breaking and upgrading heavy oil emulsions, has therefore been provided by the present invention. The process uses the water present in the emulsion to provide the hydrogen for hydrogenation and combines into one process, the two processes of water removal from the emulsion and upgrading of the heavy oil to pipeline specifications. The net hydrogen production can be used, for example to hydrotreat secondary streams in an integrated plant. The hydrogen production (water-gas shift reaction) is influenced by operating conditions, e.g. CO and water concentrations and residence times. However, the water-gas shift reaction appears to reach equilibrium at 380° C.–400° C. Conversely, the pitch conversion is only influenced by the residence time and temperature. By proper selection of the operating conditions, viscosities and densities were obtained that were lower than the pipeline specifications without significantly breaking up the oil molecules into small fragments. Any traces of water remaining separated easily. Simultaneously, significant levels of desulphurization, denitrogenation, demetallization, CCR removal and asphaltene reduction were obtained. At higher temperatures, when significant cracking is not a concern, the process still results in a net production of hydrogen. In both process schemes, the hydrogen and carbon dioxide can be separated and used in other processes.

CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

We claim:

1. A process for the thermal rearrangement of a water emulsion, or a mixture with water, for freedstock selected from the group consisting of tar sand bitumen, heavy oil, refinery residue and a heavy waste oil stream, said feedstock containing a naturally-occurring, finely-divided mineral material, which process comprises: contacting said water emulsion or said water mixture with a gas selected from the group consisting of synthesis gas and carbon monoxide in the presence of a catalytic amount, of about 0.03 to about 15%, of a bifunctional catalyst that facilitates the water gas shift reaction and also promotes the hydrogenation and stabilization of cracking reaction products, said bifunctional catalyst including said naturally-occurring, finely-divided mineral material which is contained in said feedstock, said process being conducted under such conditions of pressure and temperature that said water gas shift reaction occurs; recovering thermally rearranged liquid oil having a lower viscosity and a lower density than that of said feedstock; and also recovering separate streams of gaseous carbon dioxide and gaseous hydrogen therefrom.

2. The process of claim 1 wherein said bifunctional catalyst includes clay, sand or sand fines which are present in said feedstock as said naturally-occurring, finely-divided material.

3. The process of claim 2 wherein said bifunctional catalyst is present in said feedstock.

4. The process of claim 1 wherein said bifunctional catalyst also includes an inorganic base.

5. The process of claim 4 wherein said inorganic base is selected from the group consisting of the hydroxides and carbonates of potassium, sodium and calcium.

6. The process of claim 5 wherein said inorganic base comprises potassium carbonate.

7. The process of claim 1 wherein said bifunctional catalyst also includes an iron compound.

8. The process of claim 7 wherein said iron compound is selected from the group consisting of iron oxide, iron sulphate, iron sulphide, and an iron-containing waste material.

9. The process of claim 7 wherein said bifunctional catalyst is a Fe/Cr catalyst.

10. The process of claim 1 wherein said water emulsion of said feedstock or said mixture of water with said feedstock is prepared subsequent to the recovery of said feedstock.

11. The process of claim 1 wherein said water emulsion of said feedstock or said mixture of water and said feedstock is derived from an in-situ oil recovery operation or from a tar sand mining processing step and is prepared subsequent to recovery of said feedstock.

12. The process of claim 1 wherein a at least part of the water required for said water gas shift reaction is mixed with said feedstock prior to carrying out said thermal rearrangement reaction.

13. The process of claim 1 wherein said temperature is within the range of about 250° about 460° C.

14. The process of claim 1 wherein said temperature is within the range of about 375° to about 400° C., thereby reducing both the viscosity and the density of said heavy oil, while minimizing cracking reactions.

15. The process of claim 1 wherein said temperature is within the range of about 400° to about 460° C.

16. The process of claim 1 wherein said pressure is within the range of about 100 to about 10,000 psi.

17. The process of claim 1 wherein said pressure is within the range of about 500 to about 1500 psi.

18. The process of claim 1 wherein said thermal rearrangement process is carried out with a gas-to-liquid ratio within the range of about 9 L/kg to about 3500 L/kg.

19. The process of claim 1 wherein said process is carried out at a space velocity within the range of about 0.1 to about 20 per hour.

20. The process of claim 1 wherein said process is carried out at a residence time within the range of about 10 hours to about 3 minutes.

21. The process of claim 1 wherein said thermal rearrangement process is carried out with a carbon monoxide-to-water ratio of about 0.1 to about 15.

22. The process of claim 1 wherein said carbon monoxide is in the from of a mixture of carbon monoxide and hydrogen.

23. The process of claim 1 including the steps of forming carbon monoxide in situ, and then recovering excess carbon monoxide.

24. The process of claim 1 wherein carbon dioxide which is produced is removed by a scrubbing process, by a pressure swing absorption process, or by a membrane separation process.

25. The process of claim 1 wherein hydrogen which is produced is removed by a scrubbing process, by a pressure swing absorption process, or by a membrane separation process.

26. The process of claim 1 wherein carbon dioxide which is produced is removed by a scrubbing process, by a pressure swing absorption process, or by a membrane separation process; and wherein hydrogen which is produced is removed by a scrubbing process, by a pressure swing absorption process, or by a membrane separation process.

27. The process of claim 1 wherein carbon monoxide is produced in situ by the decomposition of a precursor thereof.

28. The process of claim 27 wherein said precursor is methanol.

29. The process of claim 1 wherein water which is present in said water emulsion of said feedstock or which is present in said mixture of water in said feedstock, is reacted to produce excess hydrogen.

30. The process of claim 1 wherein said water emulsion of said feedstock is a water-in-oil emulsion.

31. The process of claim 1 wherein said water emulsion of said feedstock is an oil-in-water emulsion.

32. The process of claim 1 wherein said feedstock also includes metal impurities; and wherein said process is carried out to effect removal of substantially all of said metal impurities.

33. The process of claim 1 wherein said process is carried out to a pitch conversion of less than about 20 wt %.

34. The process of claim 1 wherein said catalyst comprises a regenerated catalyst prepared by the process of carrying out said reaction process as claimed in claim 1, and then a) separating solid from the oil product; and b) using the solid so recovered directly as said regenerated catalyst.

35. The process of claim 1 wherein said catalyst comprises a regenerated catalyst prepared by the process of carrying out said reaction process as claimed in claim 1, and the a) distilling the oil product; b) gasifying or burning the pitch so separated; c) collecting the ash so produced; and d) using said ash directly as said regenerated catalyst.

36. The process of claim 1 wherein said bifunctional catalyst also includes a Co/Mo catalyst.

37. The process of claim 1 wherein water present in said water emulsion of said feedstock or in said mixture water and said feedstock provides at least part of the water required for said water gas shift reaction.

38. A process for the thermal rearrangement of a water emulsion, or a mixture with water, of a feedstock selected from the group consisting of tar sand bitumen, heavy oil, refinery residue and a heavy waste oil stream, which process comprises:

contacting said water emulsion or said water mixture with a gas selected from the group consisting of synthesis gas and carbon monoxide in the presence of a catalytic amount, of about 0.03 to about 15%, of a bifunctional catalyst that facilitates the water gas shift reaction and also promotes the hydrogenation and stabilization of cracking reaction products, said bifunctional catalyst including naturally-occurring mineral matter which is added separately to said feedstock, said process being conducted under such conditions of pressure and temperature that said water gas shift reaction occurs;

recovering thermally rearranged liquid oil having a lower viscosity and a lower density than that of said feedstock; and also recovering separate streams of gaseous carbon dioxide and gaseous hydrogen therefrom.

* * * * *